(12) United States Patent
Iventosch et al.

(10) Patent No.: US 10,885,395 B2
(45) Date of Patent: Jan. 5, 2021

(54) METHOD FOR SCALING FINE-GRAINED OBJECT RECOGNITION OF CONSUMER PACKAGED GOODS

(71) Applicant: Pensa Systems, Inc., Austin, TX (US)

(72) Inventors: Joel Iventosch, Austin, TX (US); James E. Dutton, Spicewood, TX (US); Sean D. Matthews, Pflugerville, TX (US)

(73) Assignee: Pensa Systems, Austin, TX (US)

( * ) Notice: Subject to any disclaimer, the term of this patent is extended or adjusted under 35 U.S.C. 154(b) by 100 days.

(21) Appl. No.: 16/443,790

(22) Filed: Jun. 17, 2019

(65) Prior Publication Data

US 2019/0385009 A1 Dec. 19, 2019

Related U.S. Application Data

(60) Provisional application No. 62/686,051, filed on Jun. 17, 2018.

(51) Int. Cl.
*G06K 9/62* (2006.01)
*G06K 9/32* (2006.01)
(Continued)

(52) U.S. Cl.
CPC ......... *G06K 9/628* (2013.01); *G06K 9/00637* (2013.01); *G06K 9/00664* (2013.01);
(Continued)

(58) Field of Classification Search
CPC ............................ G06T 11/20; G06T 2210/12
(Continued)

(56) References Cited

U.S. PATENT DOCUMENTS

| 5,896,133 A * | 4/1999 | Lynch | G06F 3/0481 |
| | | | 715/784 |
| 2009/0160856 A1* | 6/2009 | Hoguet | G06T 17/00 |
| | | | 345/420 |
| 2019/0196495 A1* | 6/2019 | Noh | B25J 19/02 |

OTHER PUBLICATIONS

Chen, Wei-Yu, et al. "A Closer Look At Few-Shot Classification." ICLR, 2019, pp. 1-16.
(Continued)

*Primary Examiner* — Kiet M Doan
(74) *Attorney, Agent, or Firm* — John A. Fortkort; Fortkort & Houston PC

(57) ABSTRACT

A method is provided for identifying consumer packaged goods (CPGs). The method comprises (a) identifying a set of objects as being a set of CPGs by applying a first level of object recognition to the set of objects, wherein said set of objects has N members, wherein N≥2, and wherein applying the first level of object recognition to the set of objects includes applying a first predefined set of criteria to the object; (b) for each of the N objects, (i) performing a second level of object recognition on the object by applying a second predefined set of criteria to the object, (ii) assigning the object to one of a plurality of predefined superclasses $S=[S_1, \ldots, S_j]$, wherein $j \geq 2$, based on the results of the second level of object recognition, (iii) applying a bounding box to the object, (iv) capturing an image of the object with an image capturing device, and (v) cropping the image to the bounding box, thereby yielding a cropped image of the object; and (c) for each object in each set $S_i \in S$, (i) performing a third level of object recognition on the cropped image of the object by applying a set of criteria $C_i$ to the object, and (ii) assigning the object to one of a plurality of predefined subclasses $B=[B_1, \ldots, B_k]$, wherein $k \geq 2$, based on the results of the third level of object recognition.

26 Claims, 2 Drawing Sheets

(51) Int. Cl.

| | |
|---|---|
| *G06K 9/46* | (2006.01) |
| *G06T 7/73* | (2017.01) |
| *G06K 9/00* | (2006.01) |
| *G06T 11/60* | (2006.01) |
| *G06T 11/20* | (2006.01) |
| *G06N 3/02* | (2006.01) |
| *G06N 5/02* | (2006.01) |
| *G06Q 10/06* | (2012.01) |
| *G06Q 10/08* | (2012.01) |

(52) U.S. Cl.
CPC ............. *G06K 9/3233* (2013.01); *G06K 9/46* (2013.01); *G06K 9/6268* (2013.01); *G06N 3/02* (2013.01); *G06N 5/02* (2013.01); *G06Q 10/06315* (2013.01); *G06Q 10/087* (2013.01); *G06T 7/73* (2017.01); *G06T 11/20* (2013.01); *G06T 11/60* (2013.01); *G06T 2207/20084* (2013.01); *G06T 2210/12* (2013.01)

(58) Field of Classification Search
USPC .......................................... 382/118; 370/249
See application file for complete search history.

(56) References Cited

OTHER PUBLICATIONS

Xu, Jiaming, et al. "Convolutional Neural Networks for Text Hashing." Proceedings of the 24th International Joint Conference on Artificial Intelligence, 2015, pp. 1369-1375.

Lai, Hanjiang, et al. "Simultaneous Feature Learning and Hash Coding with Deep Neural Networks." 2015 IEEE Conference on Computer Vision and Pattern Recognition (CVPR), Apr. 14, 2015, pp. 3270-3278., doi:10.1109/cvpr.2015.7298947.

Cao, Yue, et al. "Correlation Hashing Network for Efficient Cross-Modal Retrieval." Procedings of the British Machine Vision Conference 2017, Feb. 20, 2017, doi:10.5244/c.31.128.

Xian, Yongqin, et al. "Zero-Shot Learning—A Comprehensive Evaluation of the Good, the Bad and the Ugly." IEEE Transactions on Pattern Analysis and Machine Intelligence, vol. 41, No. 9, Jan. 2019, pp. 2251-2265., doi:10.1109/tpami.2018.2857768.

Wang, Xiaolong, et al. "Zero-Shot Recognition via Semantic Embeddings and Knowledge Graphs." 2018 IEEE/CVF Conference on Computer Vision and Pattern Recognition, Apr. 8, 2018, doi:10.1109/cvpr.2018.00717.

Zhu, Pengkai, et al. "Generalized Zero-Shot Recognition Based on Visually Semantic Embedding." 2019 IEEE/CVF Conference on Computer Vision and Pattern Recognition (CVPR), Apr. 9, 2019, doi:10.1109/cvpr.2019.00311.

Schonfeld, Edgar, et al. "Generalized Zero- and Few-Shot Learning via Aligned Variational Autoencoders." 2019 IEEE/CVF Conference on Computer Vision and Pattern Recognition (CVPR), Apr. 5, 2019, doi:10.1109/cvpr.2019.00844.

Atzmon, Yuval, and Gal Chechik. "Adaptive Confidence Smoothing for Generalized Zero-Shot Learning." 2019 IEEE/CVF Conference on Computer Vision and Pattern Recognition (CVPR), May 13, 2019, doi:10.1109/cvpr.2019.01194.

Zhao An, et al. "Domain-Invariant Projection Learning for Zero-Shot Recognition." Proceedings of the 32nd Conference on Neural Information Processing Systems (NeurIPS), 2018.

Liu, Shichen, et al. "Generalized Zero-Shot Learning with Deep Calibration Network." Proceedings of the 32nd Conference on Neural Information Processing Systems (NeurIPS), 2018.

Yu, Yunlong, et al. "Stacked Semantics-Guided Attention Model for Fine-Grained Zero-Shot Learning." Proceedings of the 32nd Conference on Neural Information Processing Systems (NeurIPS), 2018.

Guo, Yuchen, et al. "Zero-Shot Recognition via Direct Classifier Learning with Transferred Samples and Pseudo Labels" Proceedings of the Thirty-First AAAI Conference on Artificial Intelligence (AAAI-17), 2017.

Wang, Wenlin, et al. "Zero-Shot Learning via Class-Conditioned Deep Generative Models." Proceedings of the Thirty-Second AAAI Conference on Artificial Intelligence (AAAI-18), 2018.

Cao, Yue et al. "Collective Deep Quantization for Efficient Cross-Modal Retrieval." Proceedings of the Thirty-First AAAI Conference on Artificial Intelligence (AAAI-17), 2017.

Jiang, Qing-Yuan, and Wu-Jun Li. "Deep Cross-Modal Hashing." 2017 IEEE Conference on Computer Vision and Pattern Recognition (CVPR), 2017, doi:10.1109/cvpr.2017.348.

Chen, Binghui, and Weihong Deng. "Hybrid-Attention Based Decoupled Metric Learning for Zero-Shot Image Retrieval." 2019 IEEE/CVF Conference on Computer Vision and Pattern Recognition (CVPR), 2019, doi:10.1109/cvpr.2019.00286.

Lin, Kevin, et al. "Deep Learning of Binary Hash Codes for Fast Image Retrieval." 2015 IEEE Conference on Computer Vision and Pattern Recognition Workshops (CVPRW), 2015, doi:10.1109/cvprw.2015.7301269.

Cao, Yue, et al. "Deep Cauchy Hashing for Hamming Space Retrieval." 2018 IEEE/CVF Conference on Computer Vision and Pattern Recognition, 2018, doi:10.1109/cvpr.2018.00134.

Zhu, Han et al. "Deep Hashing Network for Efficient Similarity Retrieval." Proceedings of the Thirtieth AAAI Conference on Artificial Intelligence (AAAI-16), 2016.

Cao, Yue et al. "Deep Quantization Network for Efficient Image Retrieval." Proceedings of the Thirtieth AAAI Conference on Artificial Intelligence (AAAI-16), 2016.

Cao, Yue et al. "Deep Visual-Semantic Quantization for Efficient Image Retrieval." 2017 IEEE Conference on Computer Vision and Pattern Recognition (CVPR), 2017, doi:10.1109/cvpr.2017.104.

Cao, Zhangjie, et al. "HashNet: Deep Learning to Flash by Continuation." 2017 IEEE International Conference on Computer Vision (ICCV), 2017, doi:10.1109/iccv.2017.598.

Jiang, Huajie, et al. "Learning Class Prototypes via Structure Alignment for Zero-Shot Recognition." Computer Vision—ECCV 2018 Lecture Notes in Computer Science, 2018, pp. 121-138., doi:10.1007/978-3-030-01249-6_8.

Li, Wu-Jun, Sheng Wang, and Wang-Cheng Kang. "Feature learning based deep supervised hashing with pairwise labels." 2015, doi:arXiv:1511.03855.

Song, Jie, et al. "Selective Zero-Shot Classification with Augmented Attributes." Computer Vision—ECCV 2018 Lecture Notes in Computer Science, 2018, pp. 474-490, doi:10.1007/978-3-030-01240-3_29.

Lee, Chung-Wei, et al. "Multi-Label Zero-Shot Learning with Structured Knowledge Graphs." 2018 IEEE/CVF Conference on Computer Vision and Pattern Recognition, 2018, doi:10.1109/cvpr.2018.00170.

Niu, Li, et al. "Webly Supervised Learning Meets Zero-Shot Learning: A Hybrid Approach for Fine-Grained Classification." 2018 IEEE/CVF Conference on Computer Vision and Pattern Recognition, 2018, doi:10.1109/cvpr.2018.00749.

"One-Shot Learning." Wikipedia, Wikimedia Foundation, Mar. 27, 2020, en.wikipedia.org/wiki/One-shot_learning.

Felix, Rafael, et al. "Multi-Modal Cycle-Consistent Generalized Zero-Shot Learning." Computer Vision—ECCV 2018 Lecture Notes in Computer Science, 2018, pp. 21-37., doi:10.1007/978-3-030-01231-1_2.

Cao, Yue, et al. "Deep Visual-Semantic Hashing for Cross-Modal Retrieval." Proceedings of the 22nd ACM SIGKDD International Conference on Knowledge Discovery and Data Mining—KDD 16, 2016, doi:10.1145/2939672.2939812.

Verma, Vinay Kumar, et al. "Generalized Zero-Shot Learning via Synthesized Examples." 2018 IEEE/CVF Conference on Computer Vision and Pattern Recognition, 2018, doi:10.1109/cvpr.2018.00450.

Sinha, Smita. "What Is Zero-Shot Learning?" Analytics India Magazine, Jun. 18, 2018, analyticsindiamag.com/what-is-zero-shot-learning/.

(56) References Cited

OTHER PUBLICATIONS

Xian, Yongqin, et al. "Feature Generating Networks for Zero-Shot Learning." 2018 IEEE/CVF Conference on Computer Vision and Pattern Recognition, 2018, doi:10.1109/cvpr.2018.00581.
Zhao, Fang, et al. "Deep Semantic Ranking Based Hashing for Multi-Label Image Retrieval." 2015 IEEE Conference on Computer Vision and Pattern Recognition (CVPR), 2015, doi:10.1109/cvpr.2015.7298763.

* cited by examiner

METHOD FOR SCALING FINE-GRAINED OBJECT RECOGNITION OF CONSUMER PACKAGED GOODS

CROSS-REFERENCE TO RELATED APPLICATION

This application claims the benefit of priority from U.S. Provisional Patent Application No. 62/686,051, which was filed on Jun. 17, 2018, which has the same title and inventors, and which is incorporated herein by reference in its entirety.

FIELD OF THE DISCLOSURE

The present application relates generally to object recognition from images, and more specifically to recognition of Consumer Packaged Goods (CPGs).

BACKGROUND OF THE DISCLOSURE

Merchandise that consumers use up and replace on a frequent basis are known in the industry as Consumer Packaged Goods (CPGs). Brick and mortar establishments that buy and sell such merchandise are an important part of the economy. These establishments typically employ sophisticated automation to track what comes in (supply chain management systems) and what goes out (point of sale systems), but often have little visibility into what happens to the products in between. Recent advances in artificial intelligence make it feasible to survey, count, and track the movement of inventory during this period in a completely automated and objective way. One key component of this technology is the use of artificial neural networks to recognize objects from camera images.

The advent of deep convolutional neural networks (CNNs) as a mechanism for recognizing individual objects within an image or image stream (video) has revolutionized the field. See, for example, A. Krizhevsky, I. Sutskever, and G. E. Hinton, "Imagenet classification with deep convolutional neural networks", *Advances in Neural Information Processing Systems*, pages 1097-1105 (2012). In the past five years, refinements to the approach, such as augmenting a CNN with a Region Proposal Network (R-CNN), have made it possible to recognize and distinguish dozens, and even hundreds, of different object categories. See Shaoqing Ren, Kaiming He, Ross Girshick, Jian Sun, "Faster R-CNN: Towards Real-Time Object Detection and Region Proposal Networks" (2016), available online at https://arxiv.org. A yearly industry-wide contest known as "The ImageNet Large Scale Visual Recognition Challenge" (described online at http://image-net.org) is designed to push the limits of automatic object recognition and localization. At present, this contest challenges researchers worldwide to design systems that can recognize up to 1,000 distinct object classes.

SUMMARY OF THE DISCLOSURE

Figure 1:
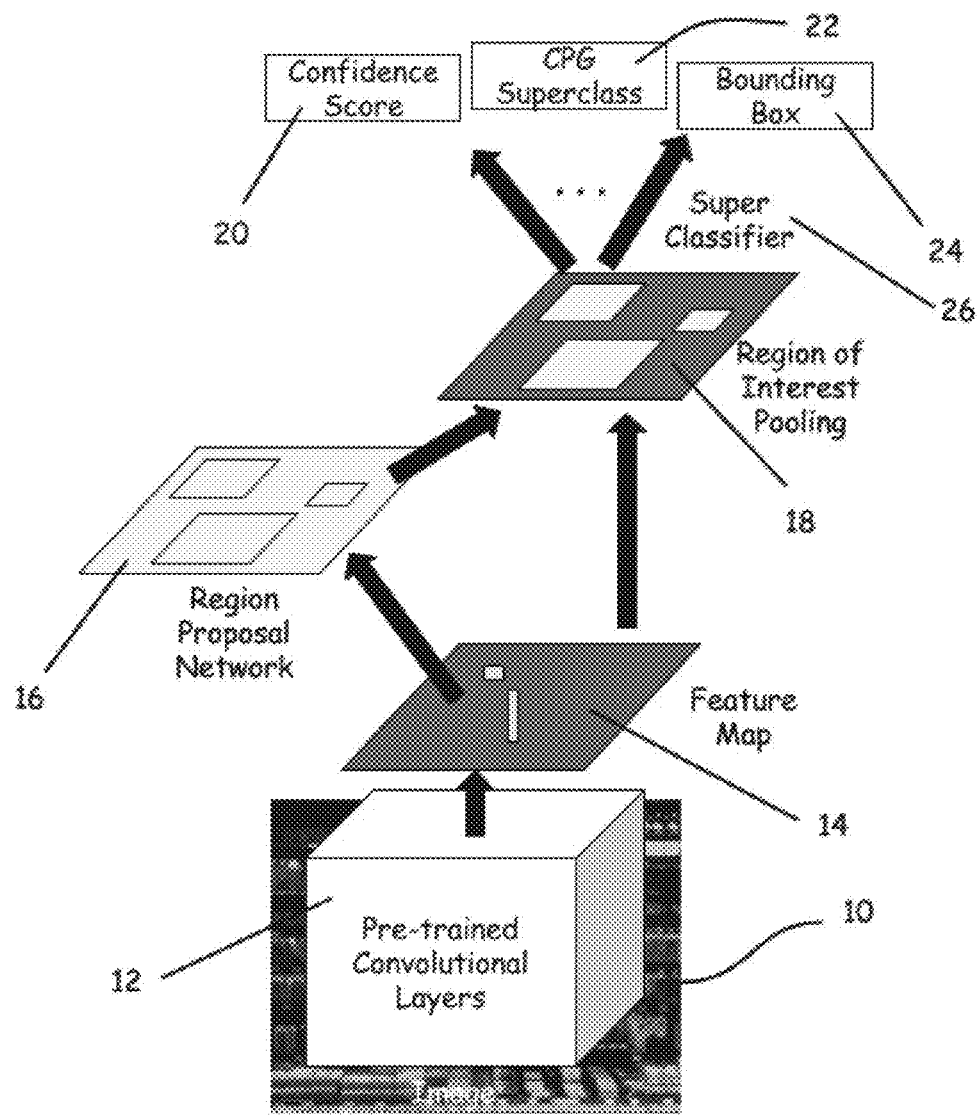
FIG. 1 is a block diagram of a CPG detector which may be utilized in the systems and methodologies described herein.

In one aspect, a method is provided for identifying consumer packaged goods (CPGs). The method comprises (a) identifying a set of objects as being a set of CPGs by applying a first level of object recognition to the set of objects, wherein said set of objects has N members, wherein N≥2, and wherein applying the first level of object recognition to the set of objects includes applying a first predefined set of criteria to the object; (b) for each of the N objects, (i) performing a second level of object recognition on the object by applying a second predefined set of criteria to the object, (ii) assigning the object to one of a plurality of predefined superclasses $S=[S_l, \ldots, S_j]$, wherein j≥2, based on the results of the second level of object recognition, (iii) applying a bounding box to the object, (iv) capturing an image of the object with an image capturing device, and (v) cropping the image to the bounding box, thereby yielding a cropped image of the object; and (c) for each object in each set $S_i \varepsilon S$, (i) performing a third level of object recognition on the cropped image of the object by applying a set of criteria $C_i$ to the object, and (ii) assigning the object to one of a plurality of predefined subclasses $B=[B_l, \ldots, B_k]$, wherein k≥2, based on the results of the third level of object recognition.

In another aspect, a method is provided for identifying consumer packaged goods (CPGs). The method comprises (a) providing an imaging device mounted on a platform and equipped with a neural network; (b) training the imaging device with a set of images of CPGs to recognize which of a set of superclasses a CPG belongs to, thereby obtaining a trained imaging device; (c) using the trained imaging device to obtain an image containing a plurality of CPGs, (d) detecting a set of CPG superclass features in the image, and generate a CPG feature map which maps the location of CPG features in the image; (e) determining, from the recognized CPG superclass features and the CPG feature map, a set of possible locations in the image where a CPG could be located, thereby yielding a set of region proposals; (f) using a region of interest pooling technique to determine if each region proposal in the set of region proposals contains an instance of an object having the detected CPG superclass features; and (g) producing a plurality of superclass proposals for each region proposal in the set of region proposals.

In a further aspect, a device for identifying consumer packaged goods (CPGs) is provided. The system comprises (a) an imaging device mounted on a mobile platform; (b) a CPG detector which is equipped with a neural network and which utilizes the imaging device to obtain an image containing a plurality of CPGs, detects a set of CPG superclass features in the image, and generates a CPG feature map which maps the location of CPG features in the image, wherein said neural network has been trained on a set of images of CPGs to recognize which of a set of superclasses a detected CPG belongs to; (c) a region proposal network which accepts the CPG feature map as input and which returns a first set of regions in the image where a CPG could be located; (d) a superclassifier which examines each region in the first set of regions to determine if the region contains an instance of a superclass of a CPG, and which outputs a second set of regions containing a CPG; and (e) a superclass proposal layer which operates on each member of the second set of regions and returns a set of superclass proposals for each region.

DETAILED DESCRIPTION

The following terms as used herein have the meanings indicated.

"Consumer Packaged Goods" (CPGs) refers to merchandise that are used daily by average consumers, and that require replacement on a frequent basis. Examples include food, beverages and household products.

"Bounding Box" refers to a rectangular box that is used to describe the location of as target (such as, for example, the location of a CPG on a shelving unit) and that can be determined by a set of coordinates (typically the coordinates of the upper right and lower left corners of the rectangle).

"Object Recognition" refers to a computer vision technique for identifying objects in images or videos, and is a key output of deep learning and machine learning algorithms. Object detection is the process of finding instances of objects in images. In the case of deep learning, object detection is a subset of object recognition, where the object is not only identified but also located in an image. This allows, for example, for multiple objects to be identified and located within the same image.

"Cropping" refers to the removal of areas outside of an indicated region. For example, cropping an image of a CPG top a bounding box refers to removal of portions of the image outside of the bounding box.

"Mobile Platform" refers to a mobile device (such as a drone or a robot) which is equipped with navigational and image capture abilities. Thus, the mobile platforms described herein have the ability to travel to a suitable location from which CPGs can be viewed on a shelving unit, and further have the ability to capture images of the CPGs for subsequent analysis.

"Region Proposal Network" refers to a network (such as a convoluted neural network) which proposes objects that are identifiable within a particular image.

"Region of Interest (RoI)" refers to a layer (for example, in a Fast Region-based Convolutional Network or R-CNN) which reshapes inputs with arbitrary size into a fixed length output.

"Region of Interest (RoI) Pooling" refers to a type of pooling layer which performs max pooling on inputs (such as, for example, feature maps) of non-uniform sizes and produces a small feature map of fixed size.

"Max Pooling" refers to a feature for example, in convolutional neural network architectures) which accumulate features from maps generated by convolving a filter over an image, typically by applying a max filter to (usually non-overlapping) subregions of an initial representation. It is typically utilized to reduce overfitting errors and computational costs.

"Superclass" refers to a class from which other classes are derived.

Attempts to apply the above noted research results to the recognition of Consumer Packaged Goods (CPGs) in real world environments have encountered at least two significant obstacles. First, the ImageNet Challenge and related research is typically focused on the problem of recognizing broad categories of objects, such as "dogs" or "faces". Such objects often appear only once or twice in any given image. CPGs, on the other hand, are usually displayed in densely-packed arrangements (as, for example, on a shelf at a grocery store). Consequently, it is typically necessary to categorize CPGs in a much more fine-grained manner, down to the actual SKU or product code.

The second problem with current approaches, at least when applied to CPG recognition, is the shear number of categories that must be distinguished. Thus, for example, a typical grocery store might display up to 50,000 different SKUs, and superstores may contain up to twice that number. The number of SKUs present in these environments are two orders of magnitude greater than the current state of the art for automated object recognizers.

Academic efforts to go from hundreds to thousands of recognized categories include attempts to decouple the task of object detection (which may involve automatically drawing a bounding box around an object of interest) and object classification (which may involve determining the most likely category of the object within the bounding box). By contrast, conventional approaches often perform both those tasks simultaneously in order to improve recognition speed at the expense of scalability.

One approach to scaling object recognition is to derive a few (less than 100) abstract superclasses of objects, and then use those superclasses to aid in object detection. The superclasses may be derived, for example, by clustering deep semantic features of thousands of training images. See, for example, Bharat Singh, Hengduo Li, Abhishek Sharma, Larry S. Davis, "R-FCN-3000 at 30 fps: Decoupling Detection and Classification" (2017), which may be found online at www.cs.umd.edu. After an object has been detected, the image may be cropped and passed to a fine-grained object classifier. One very interesting result of this work is that, even if the number of derived superclasses is reduced to just one, the overall detection and recognition accuracies for untrained images are still quite good, even at scale. In other words, generic "objectness" seems to be a robust and stable trait, at least among the images in the ImageNet data set.

Applying this decoupled approach to in situ images of CPGs, however, does not yield similarly promising results. The problem is that CPGs in those images, unlike objects in ImageNet images, are not sparse, isolated, and surrounding by background. Instead, they are densely-packed, numerous, and surrounded mostly by other CPGs. There thus exists a need in the art for a system and method that can automatically recognize and account for tens of thousands of fine-grained CPG categories from digital images of densely-packed products displayed in their natural, ready-for-sale state. This need, and others, may be addressed with the systems and methodologies disclosed herein.

In one aspect, scalable CPG recognition systems and methodologies are disclosed herein. In a preferred embodiment, these systems and methodologies first detect, and then classify, individual instances of CPGs within an image or image stream. This is accomplished by detecting the bounding boxes for objects that exhibit the generic trait of "CPG-ness," characterized by a relatively small number of identified superclasses. Once a CPG is detected, the image is cropped to its bounding box and handed off to one or more sub-classifiers. In a typical embodiment, there may be several sub-classifiers.

This approach advantageously exploits several distinguishing features of CPGs that are not exhibited by objects more generally. For example, CPGs typically fall into a fairly narrow range of shapes and sizes, compared to objects in general. Thus, objects as small as a single pencil, or large as a house, are unlikely to be CPGs. Moreover, although there are many distinct categories of CPGs (for example, Campbells® Chicken Soup and Campbells® Tomato Soup), all instances of a particular category are likely to be very similar (or even identical) to each other in appearance. This situation may be contrasted to other applications of object recognition, such as those applied to the identification of dogs or faces. In fact, it is typically the case that CPGs are intentionally designed to be recognized. In particular, manufacturers and brand companies typically want people to be able to easily pick out their products on the shelf, even from a distance. Furthermore, CPGs typically come in a relatively small number of different package types such as, for example, bottles, jars, boxes, tubes, bags, and blister packs.

The total number of SKUs (CPG categories) in the world is enormous (presently on the order of millions). However, it has been found that the CPG detectors, which are preferably employed in the systems and methodologies disclosed herein, may be effectively trained on a few thousand CPG images. Once trained, these CPG detectors may then be able to detect "CPGness" in a stable and extensible manner, and with little or no additional training as new CPGs are added to the system. By partitioning the recognition task by superclass, each sub-classifier may only be required to distinguish, at most, among a few thousand categories. This makes the classification problem once again tractable for state of the art object recognition techniques.

In a preferred embodiment, the (preferably generic) CPG detector outputs a confidence score for each detection/superclass. The outputs of the CPG detector, including superclasses, bounding boxes, and confidence scores, are used to crop the detected images and then select one or more sub-classifiers from a plurality of sub-classifiers. The cropped CPG images are submitted to each of the selected sub-classifiers, sequentially or in parallel, producing a plurality of fine-grained categories and a confidence score for each. The final confidence score for each CPG is preferably the product of the superclass and sub-classifier confidence scores (that is, the final confidence score for each CPG is preferably the probability that the object belongs to the given superclass AND the given category within it).

Referring now to the drawings, in which like reference numerals refer to like elements, FIG. 1 depicts a block diagram of a particular, non-limiting embodiment of the methodology utilized by a CPG detector in a preferred embodiment of the systems and methodologies described herein. As seen therein, the method commences with the processing of a digital image 10 by a deep convolutional neural network (CNN) 12 that has been pre-trained to recognize primitive features, and thus has pretrained convolutional layers. The final convolutional layer of the CNN will reflect a feature map 14 of the features recognized in the image. These are used as input to a region proposal network 16 (which finds all possible places in the image where a CPG could be located), and then combined using a region of interest pooling (RoI) technique 18 (the ROI technique 18 is a technique for using a neural-net layer for object detection tasks). Each proposed region is examined to determine if it contains an instance of one of a relatively small number (preferably less than 100) of static superclasses of CPGs. This task is accomplished by a superclassifier 26. The exact number and types of superclasses, and the method of training the superclassifier, may differ from one embodiment or application to another, as explained below. In a preferred embodiment of this method, the CPG detector uses the Faster R-CNN technique, in combination with a customized CPG superclassifier, to implement the methodologies described herein.

The RoI layer is finally processed using a softmax output layer that utilizes a softmax function (or normalized exponential function) to produce a plurality of superclass proposals for each region. Each superclass proposal is a variable with 3 fields consisting of a CPG superclass 22, a confidence score 20, and a bounding box 24. The superclass proposals, including confidence scores, are used to select one or more subclassifiers. In some embodiments, this plurality of proposals may be constrained to a small number (for example, two or three) depending, for example, on compute resources available to the subclassifiers.

Figure 2:
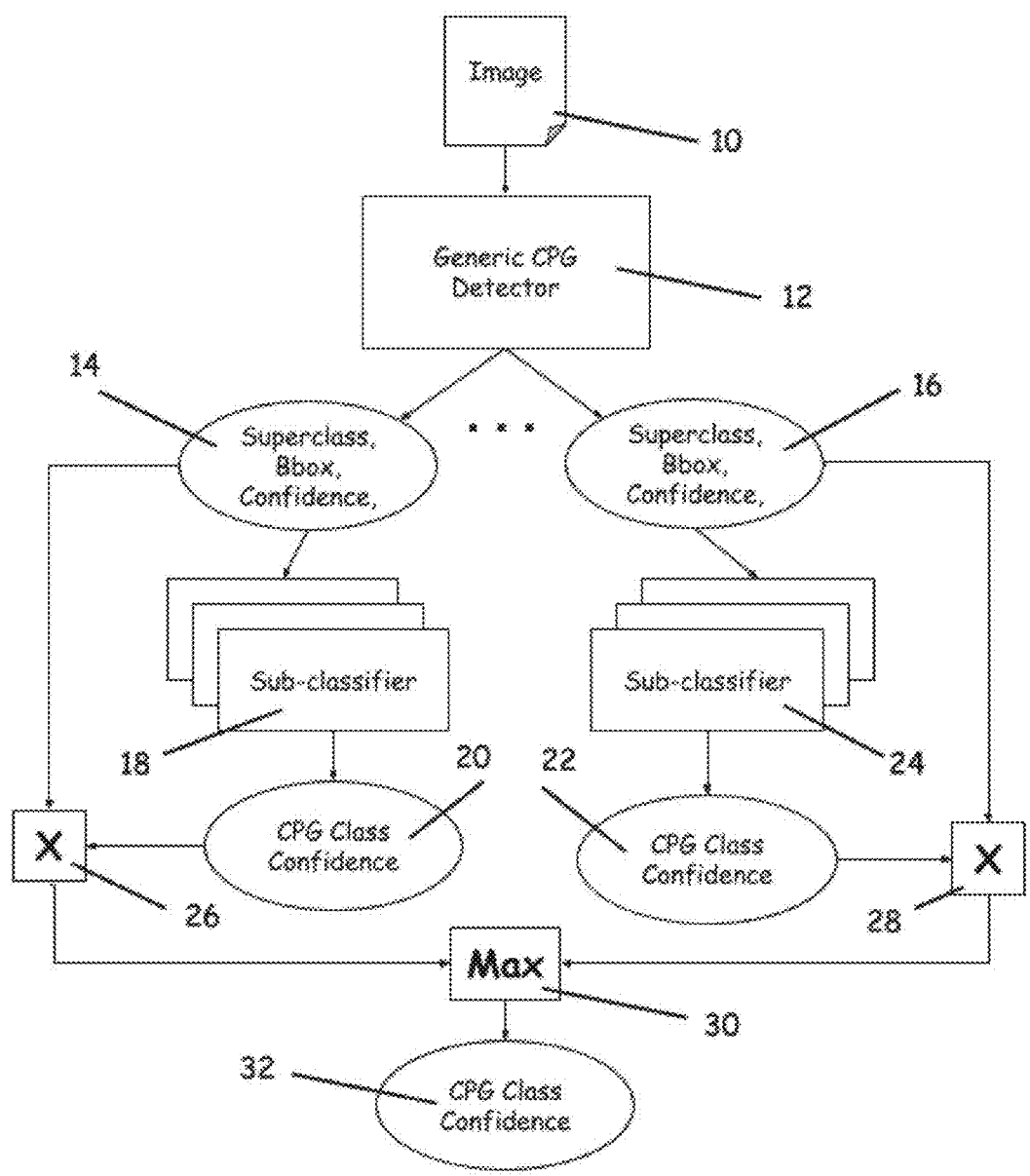
FIG. 2 is a block diagram of an embodiment of a CPG recognition method in accordance with the teachings herein.

FIG. 2 depicts a particular, non-limiting embodiment of the overall CPG recognition method, in which the image and CPG detector described above are shown in summary form as 10 and 12, respectively. The superclass proposals 14 and 16, which are output from the CPG detector, are input to a plurality of sub-classifiers 18 and 24. The output of each sub-classifier is a single CPG class (which maps to a single SKU or UPC) and a confidence score. This confidence score from the sub-classifier is multiplied by the confidence score from the CPG detector in 26 and 28. The result represents the combined probability that the recognized object is indeed a member of the sub-classifier's superclass AND is an instance of the identified CPG category (SKU). The largest such combined confidence score is computed in 30 in order to select a single CPG class 32 for each bounding box detected.

In some embodiments of the systems and methodologies described herein, CPG superclasses are defined using aspect ratios such as, for example, the relative width and height of the bounding boxes in labeled training data. For example, and for illustration purposes only, all CPGs that are roughly twice as high as they are wide may fall into the same superclass.

In some embodiments of the systems and methodologies described herein, CPG package types are utilized to distinguish superclasses. A superclassifier is preferably trained using labeled training data to recognize a variety of kinds of CPG packaging. Such CPG packaging may include, but is not limited to, bottles, cans, jars, boxes, bags, tubes, and the like.

In some embodiments of the systems and methodologies described herein, conventionally-defined product categories may be utilized to define CPG superclasses. Examples of product categories that serve as superclasses in such embodiments may include cereal, beer, canned goods, baking goods, home healthcare, and the like.

In some embodiments of the systems and methodologies described herein, proximal and contextual display conventions are utilized to distinguish CPG superclasses. In such embodiments, since products that are normally shown together are more likely to be in the same superclass, most of the objects in a given image may be recognized using a small number of sub-classifiers (and in some instances, only one sub-classifier).

In some embodiments of the systems and methodologies described herein, the number of superclasses utilized is fixed, and the full CPG space is partitioned using deep semantic features of the training images.

In some embodiments of the systems and methodologies described herein, images or video may be captured using various image and video capturing devices. Preferably, these image and video capture devices are digital cameras mounted on a platform. In some cases, the platform may be a robot, a vehicle, or a movable cart. However, the use of drones is especially preferred, given their ability to rapidly traverse the isles of a conventional brick-and-mortar store and to capture images and video from various angles and elevations. It will be appreciated, however, that in some embodiments, sets of cameras mounted to a stationary platform may be utilized instead, or in conjunction with any of the foregoing.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. It will also be appreciated that the various features set forth in the claims may be presented in various combinations and sub-combinations in future claims without departing from the scope of the invention. In particular, the present disclosure expressly contemplates any such combination or sub-combination that is not known to the prior art, as if such combinations or sub-combinations were expressly written out.

What is claimed is:

1. A method for identifying consumer packaged goods (CPGs) on a shelving unit, cornprising:
    identifying a set of objects as being a set of CPGs by applying a first level of object recognition to the set of objects, wherein said set of objects has N members, wherein N≥2, and wherein applying the first level of object recognition to the set of objects includes applying a first predefined set of criteria to the object;
    for each of the N objects,
        (a) performing a second level of object recognition on the object by applying a second predefined set of criteria to the object,
        (b) assigning the object to one of a plurality of pre-defined superclasses S=[$S_1$, . . . $S_j$], wherein J≥2, based on the results of the second level of object recognition,
        (c) applying a bounding box to the object,
        (d) capturing an image of the object with an image capturing device, and
        (e) cropping the image to the bounding box, thereby yielding a cropped image of the object;
    for each object in each set $S_i \in S$,
        (a) performing a third level of object recognition on the cropped image of the object by applying a set of criteria $C_i$ to the object, and
        (b) assigning the object to one of a plurality of pre-defined subclasses =[$B_1$, . . . , $B_k$] wherein k≥2, based on the results of the third level of object recognition; and
    generating a single CPG class and a confidence score.

2. The method of claim 1, wherein any two members of the sets of criteria C=[$C_i$, . . . , $C_j$] are distinct.

3. The method of claim 1, wherein applying a bounding box to the object occurs prior to performing the second level of object recognition, and wherein applying the second predefined set of criteria to the object includes determining an aspect ratio of the bounding box.

4. The method of claim 3, wherein said aspect ratio is selected from the group consisting of ratios of height to width and ratios of width to height.

5. The method of claim 1, wherein applying the second predefined set of criteria to the object includes determining the packaging type of the object.

6. The method of claim 5, wherein the packaging type is selected froma group consisting of bottles, cans, jars, boxes, bags and tubes.

7. The method of claim 5, wherein the step of applying the second predefined set of criteria to the object is performed by a system equipped with a neural network, and wherein, prior to the step of applying the second predefined set of criteria to the object, the neural network is trained on a sample of CPGs.

8. The method of claim 1, wherein said CPGs are disposed on a plurality of shelving units, and wherein each shelving unit contains a plurality of shelves.

9. The method of claim 8, wherein said image capture device is mounted on a mobile platform, and further comprising:
    periodically capturing images from said image capture device as said mobile platform traverses a route which takes it past each of said plurality of shelves.

10. The method of claim 1, wherein said image capture device is mounted on a drone.

11. The method of claim 1, wherein applying the first level of object recognition to the set of objects includes processing a digital image of the set of objects with a deep convolutional neural network.

12. The method of claim 11, wherein processing the digital image of the set of objects with a deep convolutional neural network yields a feature map of features recognized in the image.

13. The method of claim 12, further comprising:
    inputting the feature map into a region proposal network; and
    obtaining from the region proposal network a set of proposed regions in the digital image for the location of a CPG.

14. The method of claim 13, further comprising:
    combining the features in the feature map using a Region of Interest (RoI) pooling technique.

15. The method of claim 14, wherein the RoI pooling technique involves using a neural-net layer for an object detection task.

16. The method of claim 15, further comprising:
    determining whether each proposed region contains an instance of a superclass of a CPG.

17. The method of claim 16, wherein determining whether each proposed region contains an instance of a superclass of a CPG is accomplished with a CPG detector utilizing the Faster R-CNN technique in combination with a CPG super-classifier.

18. The method of claim 17, wherein determining whether each proposed region contains an instance of a superclass of a CPG yields an RoI layer, and further comprising:
    utilizing a normalized exponential function to produce a plurality of superclass proposals for each RoI.

19. The method of claim 18, wherein each superclass proposal is a variable comprising first, second and third fields, wherein said first field is a CPG superclass, wherein said second field is a confidence score, and wherein said third field is a bounding box.

20. A method for identifying consumer packaged goods (CPGs), comprising:
    providing an imaging device mounted on a platform and equipped with a neural network;
    training the imaging device with a set of images of CPGs to recognize which of a set of superclasses a CPG belongs to, thereby obtaining a trained imaging device;
    using the trained imaging device to
        (a) obtain an image containing a plurality of CPGs,
        (b) detecting a set of CPG superclass features in the image, and
        (c) generate a CPG feature map which maps the location of CPG features in the image;
    determining, from the recognized CPG superclass features and the CPG feature map, a set of possible locations in the image where a CPG could be located, thereby yielding a set of region proposals;
    using a region of interest pooling technique to determine if each region proposal in the set of region proposals contains an instance of an object having the detected CPG superclass features;
    producing a plurality of superclass proposals for each region proposal in the set of region proposals;

inputting the plurality of superclass proposals into a plurality of subclassifiers; and receiving from at least some of the plurality of subclassifiers a single CPG class and a confidence score.

21. The method of claim 20, wherein said neural network is a deep convolutional neural network.

22. The method of claim 20, wherein the method is performed utilizing the Faster R-CNN technique.

23. The method of claim 20, wherein the plurality of superclass proposals are produced using a supermax function.

24. The method of claim 20, wherein each superclass proposal includes a CPG superclass, a confidence score and a bounding box.

25. The method of claim 24 wherein, if the confidence score for the highest ranking superclass proposal exceeds a parameterized threshold, then only that one proposal is produced.

26. The method of claim 20 wherein, if the confidence score is less than the threshold, then more than one proposal is produced by incrementally selecting the highest confidence scores until the sum of the scores for all selected proposals exceeds the threshold.

\* \* \* \* \*